Oct. 24, 1967  A. PEREZ  3,348,348
VITREOUS TILE AND MOUNTING STRUCTURE THEREFOR
Filed July 1, 1963

INVENTOR.
AGUSTIN PEREZ
BY
Nilsson, Robbins & Anderson
ATTORNEYS.

United States Patent Office 3,348,348
Patented Oct. 24, 1967

3,348,348
VITREOUS TILE AND MOUNTING STRUCTURE THEREFOR
Agustin Perez, 616 S. Electric Ave., Alhambra, Calif. 91803
Filed July 1, 1963, Ser. No. 291,638
9 Claims. (Cl. 52—391)

This invention relates generally to decorative and protective tiles, and more particularly to such tiles which are vitrified to the extent that they are non-porous, hereinafter referred to generally as "glass tiles," and of the character typically used for decorative or protecting facing of a supporting surface such as a wall or floor.

More specifically, the invention concerns such tiles in combination with structure for attachment to the supporting surface.

The technique of facing a surface with tiles, particularly non-vitreous ceramic tiles, has been practiced for centuries because of its decorative and protective merits and because of its relative permanence. In recent years, the practice has come particularly widely into vogue and is presently being used very widely in all types of building endeavors.

As noted above, non-vitreous tiles have many appealing attributes as compared to non-ceramic facing materials; however, they suffer from a number of disadvantages when compared to vitreous or glassy phase materials. For example, non-vitreous tiles are relatively weak and they are inherently opaque thereby precluding any translucence or color depth qualities. In addition, they are inherently porous, and even if surface glazed they remain vulnerable to impregnation of moisture and contaminants through their non-glazed surfaces and through pinhole imperfections and cracks in their glazed surfaces. This porosity limits their usefulness in underwater applications, exterior use in colder latitudes where freezing of absorbed water causes breakage, hospital and kitchen use where the porous material constitutes an unsanitary harbor for soil and harmful microorganisms, and in many applications where their porosity causes them to be difficult to clean, such as in pool or shower areas where algae, mold or soap residue are prone to accumulate.

Glass tiles, on the other hand, are relatively very strong and permanent both as to structural integrity as well as to colorfastness. Further in regard to their colors, glass tiles can be readily manufactured in an infinite variety of colors and hues with any desired degree of transparency or translucence.

In addition, glass tiles may be surface embossed or etched or cut, or otherwise sculptured for additional freedom and versatility of design. Their non-porous character regardless of such surface treatments permits their use in pool, shower, fountain, hospital and kitchen areas where ability to clean hygienically and to clean easily is of vital concern. Further, the non-porous surface of the glass minimizes the clinging thereto and the accumulation thereon of foreign matter.

However, some of the very qualities of glass tiles which make them otherwise meritoriously attractive for use have heretofore caused them to be troublesome to use. For example, their glassy phase, impervious nature causes considerable difficulty in adhering them to their supporting surface since the adhesive cement or mortar generally cannot permanently grip the glass.

Previous attempts to develop techniques for securing glass tile to their supporting surface have typically been directed toward elaborate or intricate bracket mechanisms which are first attached to the supporting surface and then to the tile. Not only are such bracket systems unwieldy in use, but they require extensive additional cost and labor.

Furthermore, such bracket systems generally are not adaptable for permitting the replacement of single broken tiles or the replacement of a larger number of tiles as for remodeling or changing their color scheme.

Accordingly, it is an object of the present invention to provide a combined glass tile and mounting structure which is not subject to these and other disadvantages of the prior art.

It is another object to provide such a glass tile system which permits inexpensive and versatile installation of glass tile facing to a supporting surface.

It is another object to provide such a glass tile system which permits readily and removal and replacement of glass tiles without requiring new cement or adhesive and without requiring skilled labor.

It is another object to provide such a glass tile system which exhibits the advantages of glass tiles indicated above without suffering the mounting difficulties of the prior art.

Briefly, These and other objects are achieved in accordance with the structure features of one example of the invention which includes a glass tile body formed with undercut or rearwardly beveled side edges. A number of retaining tabs are formed integrally with the tile body and extend outwardly coplanarly from the rear surface of the tile body into the undercut or beveled region. The length of the tabs is somewhat less than the width of the undercut region so that the tabs do not project outside the plan projection perimeter of the face of the tile body.

A plurality of springs having end loops or hooks for retention by the retaining tabs are then stretched across the back surface of the tile with the hooks placed over the tabs.

The tile assembly thusly combined is installed on a supporting wall by placing it with its back surface against the wall to which has been applied a layer of mortar or cement into which the springs are imbedded.

The springs are supported rigidly by the mortar into which they are thusly immersed and the springs in turn support the tile by their engagement with the retaining tabs.

The tile is thereby securely affixed to the wall in a positive fashion and cannot inadvertently be dislodged therefrom because of the interlocking achieved between the springs and the cement.

However, when desired the tile can be removed simply by lifting a tabbed edge of the tile from the wall, thereby stretching the springs, for a distance to provide access to the hooks and tabs in the undercut region. The hooks may then be disengaged from the tabs and the tile removed from its setting without significantly dislodging the springs from the mortar into which they have been set. A replacement may be installed by exactly the reverse process.

Thus the tiles are positively held to the wall but may be replaced for repair or for remodeling or redecoration without destroying the tiles.

Further details of these and other novel features, as well as additional objects and advantages of the invention, and its principles of operation will become apparent and be best understood from a consideration of the following description taken in connection with the accompanying drawing which is presented by way of illustrative example only, and in which.

Figure 1:
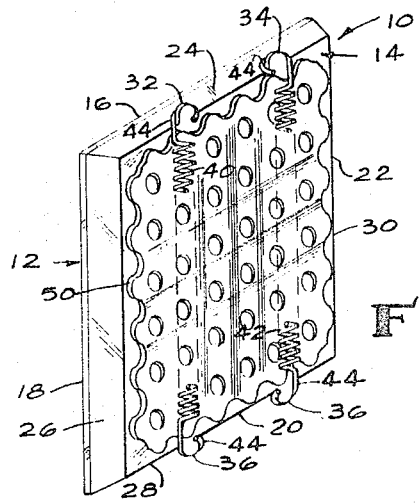
FIG. 1 is a rear perspective view of an example of a glass tile combination constructed in accordance with the principles of the present invention.

Referring to the figures in more detail, it is stressed that the particulars shown are by way of example and for purposes of illustrative discussion only; and are presented in the cause of providing what is believed to be the most useful and readily understood description of the principles and structural concepts of the invention. Specifically, the detailed showing is not to be taken as a limitation upon the scope of the invention which is defined by the appended claims forming along with the drawing a part of this specification.

In FIG. 1, an example of the invention is illustrated which includes a glass tile body portion 10 which, in this example is approximately square with a frontal surface 12, a rear surface 14 and four substantially equal in length edges 16, 18, 20, 22. Each of the edges are shown in this example to be rearwardly beveled to form an undercut region 24, 26, 28, 30, respectively.

On each of at least two opposite edges, in this case edges 16, 20, a pair of retaining tabs 32, 34 and 36, 38, respectively, are formed integrally with the tile body portion 10. Each of the tabs is, therefore, made of glass and extends coplanarly with the rear surface 14 into the undercut regions 24, 28, respectively. The length of the tabs is not critical. However, for versatility in laying up an array of the tiles on the supporting surface, it is preferable that they extend into the undercut regions but not beyond the perimeter of the plan projection of the frontal surface 12 of the tile body portion 10.

A pair of mounting springs 40, 42 each having a length somewhat shorter than the spacing between a pair of opposite retaining tabs. Each of the mounting springs 40, 42 is wound of spring steel wire and is formed with an end hook 44 which is adapted to removably engage a respective one of the retaining tabs in the manner shown whereby the respective mounting spring will be snugly but not non-elastically tensioned. The cross sectional shape of the mounting springs 40, 42 preferably is not circular but is slightly flattened or otherwise eccentric to minimize any tendency on the part of the mounting springs to roll from side to side during the setting process.

Interposed between the mounting springs 40, 42 and the rear surface 14 of the tile body 10 is a foramenated mortar engaging back plate 50 which may, when desired, be slightly corrugated as shown, across its mid-portions for purposes of greater interlocking capability with respect to the mortar or cement. The function of the backing plate 50 when used is primarily structural as will be explained in more detail in connection with the subsequent figures. However, it may also serve aesthetic purposes when the tile body 10 is cast of particularly highly translucent material. In such event, the backing plate 50 may be chosen to be either reflective or absorptive, optically, or may in other ways be adapted for cooperating aesthetically with the frontal appearance of the tile body.

It will be apparent to the reader that the undercut regions which are furnished in this example by the rearwardly beveling of the tile body may be formed in any one of a variety of casting techniques. Similarly, the retaining tabs may take a variety of forms without departing from the scope of the invention. It should be noted that a further advantage of glass tiles is that the relatively small and relatively thin nature of the tabs, in whatever form they are provided by the artisan, are relatively strong because of the strength of the vitrified material of which the tile is cast.

Figure 2:
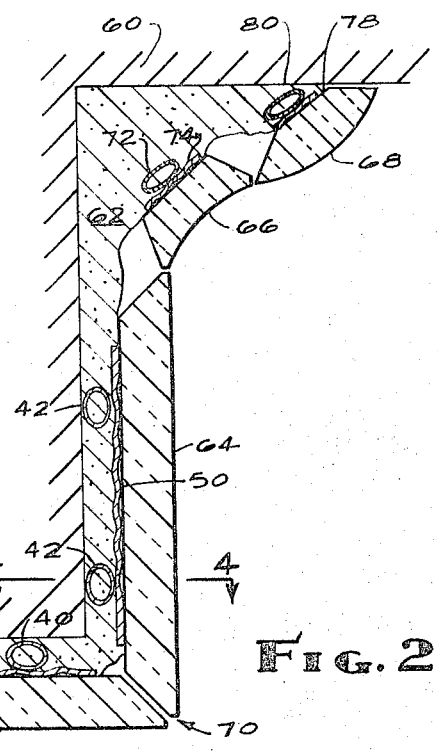
FIG. 2 is a cross sectional view of a portion of an array of such glass tile combinations shown affixed to a supporting wall.

Referring to FIG. 2, a horizontal cross section is shown taken through a supporting wall 60 over which a mass of mortar 62 has been spread for purposes of mounting a plurality of glass tiles 64 (similar to the assembly shown in FIG. 1), a corner strip 66, and an edge trimming glass tile strip 68. The thickness of the mortar 62 is seen to be adequate for engaging inter-lockedly the back plates 50 while substantially totally encompassing the mounting springs 40, 42 by which the glass tiles 64 are secured to the wall.

A further advantage of the edges of the tiles being beveled, preferably at approximately 45°, is indicated in the figure where the two glass tiles 64 meet and cooperatively trim the resulting "outside" corner 70 of the resulting, tile faced wall.

The length of the trimming corner strip 66 is preferably chosen in modular fashion to be equal to the length of one of the sides or edges 18, 22 of the glass tiles; and its width may be chosen for aesthetic satisfaction and for ability to support at least one mounting spring 72 by which it is secured to the supporting wall 16 through the mortar 62. A smaller backing plate 74 may be utilized as desired. The frontal surface of the corner strip 66 is a cylindrical arc and is preferably, for an inside right angle corner as shown, formed with a concave 90° arc in order to provide a smooth transition around the "inside" corner.

Similarly, the edge trimming strip 68 is formed with a length equal to that of the edges 18, 22 and with a width which is selected primarily by aesthetic criteria. It is important, however, that its rear surface 78 have adequate width for providing retaining tabs, not shown, for at least one mounting spring 80.

When the finished array of tiles 64, 66, 68 have been layed up, the interstices between their adjacent and separated edges may be filled as desired by conventional grout, not shown.

Figure 3:
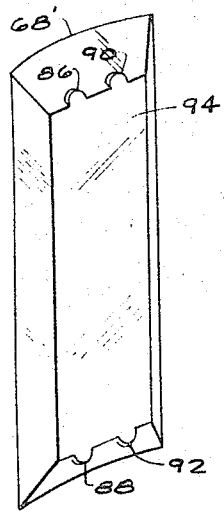
FIG. 3 is a rear perspective view of an edge trim glass tile strip constructed in accordance with the principles of the present invention.

Referring to FIG. 3, an alternative example of an edge trimming strip 68' is illustrated which has been formed to include two pair of mounting spring retaining tabs 86, 88 and 90, 92, respectively. As with the beveled edges shown and discussed in connection with FIG. 1, the retaining tabs project coplanarly with the rear surface 94 into an undercut region at either end of the strip 68' as shown.

Figure 4:
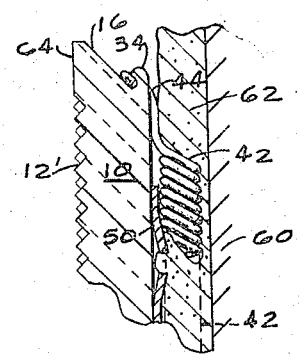
FIG. 4 is a detailed cross sectional view of a portion of a glass tile combination affixed to a supporting wall in accordance with an example of the invention.

In FIG. 4 a sectional view in detail of a portion of the structure shown in FIG. 2 taken along the lines 4—4 thereof is presented which shows the upper edge 16 of a glass tile 64 and one of the retaining tabs 34 formed integrally with the tile body 10. A portion of the mounting spring 42 is shown with its end hook portion 44 disposed removably over and about the retaining tab 34. The remainder or body portion of the mounting spring 42 is shown imbedded in the setting mortar 62 which is also shown to be interlockedly engaged with the foramenated backing plate 50.

Figure 5:
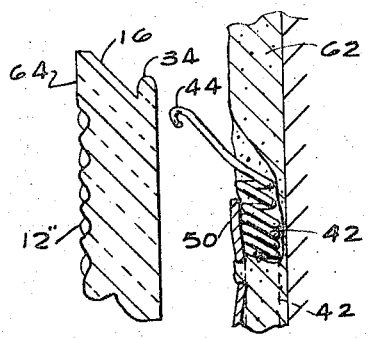
FIG. 5 is a detailed cross sectional view of a portion of such a glass tile during the process of replacing it in or from an array of glass tiles on a supporting wall.

In FIG. 5 the process of removing or replacing one of the glass tiles 64 is illustrated. If the tile 64, of FIG. 5, is being removed, the grout along the outermost portion of its edge 16 is removed and the edge 16 is pried or otherwise lifted away from the mortar bed 62 as shown. As this is done, the tile 64 readily leaves its contact with the foramenated backing plate 50; and the end few turns of the mounting spring 42 are extended elastically to permit the indicated lifting away of the top edge of the tile.

The lifting away step causes a breaking away and removing of the small amount of mortar which was previously interlocked in the interstices of these last few turns of the mounting spring 42. When the edge 16 of the tile has been lifted a small distance from the mortar bed 62, access is provided into the undercut region and the hook portion 44 may be removed from the retaining tab 34. The backing plate 50, in addition to its aesthetic functions when the tiles 64 are particularly translucent, retains its position by virtue of the strength of its bond to the mortar bed 62 so that the mounting springs 42 may not be broken away from the mortar bed except at its last few turns as shown in the figure.

The replacement tile may be then placed over the tile bed in exactly the reverse process. The replacement tile is placed approximately in its final position, the hook portion 44 of the mounting spring 42 is extended and placed over the retaining tab 34 and the tension in the mounting spring is permitted to draw the replacement tile snugly home over the tile bed 62 in substantially exactly the position of the tile which it has replaced.

The frontal surfaces 12′ and 12″ of the tiles 64 of FIG. 4 and FIG. 5, respectively, are shown to be fancifully etched or otherwise sculptured as desired to complete the aesthetic design desired by the artist or artisan.

There have thus been disclosed a number of examples and structural aspects of a vitreous tile and mounting structure combination which achieves the objects and exhibits the advantages set forth hereinabove.

What is claimed is:

1. A vitreous tile and mounting structure combination comprising:
   a tile body formed to include a frontal and a rear surface and a pair of substantially opposite edges;
   a spring end retaining means formed integrally with said tile body along the rear portion of each of said opposite edges;
   at least one elongated mounting wire spring with tile body engaging means disposed at each end thereof for releasably supportingly engaging the spring end retaining means of said tile body and having a length when so engaged whereby said mounting spring is in tension across said rear surface of said tile body and a thin foramenated mortar engaging back plate disposed over a major portion of said rear surface of said tile body and interposed between said tension spring and said tile body rear surface.

2. The invention according to claim 1 in which said frontal surface extends laterally beyond said rear surface in at least a portion of the length of said substantially opposite edges to form a plurality of undercut regions.

3. The invention according to claim 1 in which said integrally formed spring and retaining means comprises a plurality of tabs each extending laterally outwardly from said rear surface of said tile body and into and not beyond one of said undercut regions.

4. The invention according to claim 1 in which said tile body engaging means disposed at each end of said spring comprises a hook portion formed by the wire end of said spring and adapted releasably to hook over a respective one of said tabs for retaining and tensioning said spring.

5. A vitreous tile and mounting combination comprising:
   a tile body having frontal and rear surfaces and a pair of substantially opposite edges, said frontal surface extending beyond said rear surface in the region of at least a portion of said edges to form a plurality of undercut regions;
   a plurality of retaining tabs each formed integrally with said tile body and extending laterally from said rear surface into one of said undercut regions,
   at least one such tab being disposed on each of said edges; and
   at least one mounting spring having retaining tab engaging hook means affixed at each end thereof and having an untensioned length which is slightly less than the lateral spacing between opposite ones of said retaining tabs, said spring being adapted to be tensioned across said rear surface of said tile body when said hook means are each affixed to respective ones of said retaining tabs.

6. The invention according to claim 5 in which said mounting spring is formed with a cross section which is partially flattened and thereby transversely elongated along the plane of said rear surface of said tile body.

7. The invention according to claim 6 which further includes a foramenated substantially rigid mortar engaging back plate disposed between said spring and said tile body.

8. The invention according to claim 6 in which said undercut regions are defined by bevels formed between said edges and said rear surface of said tile body.

9. The invention according to claim 8 in which said retaining tabs are formed substantially coplanarly with said rear surface of said tile body and which extend into the beveled undercut regions of said edges but not beyond the perimeter of the plan projection of said front surface.

References Cited
UNITED STATES PATENTS

| | | | |
|---|---|---|---|
| 895,884 | 8/1908 | McLeod | 52—391 |
| 2,016,918 | 10/1935 | Born | 52—385 |
| 2,895,246 | 7/1959 | Menges | 40—138 X |
| 2,924,963 | 2/1960 | Taylor et al. | 52—384 X |
| 3,015,193 | 1/1962 | Amoruso | 52—392 X |
| 3,142,938 | 8/1964 | Eberhardt | 52—385 |

FRANK L. ABBOTT, *Primary Examiner.*

ALFRED C. PERHAM, *Examiner.*

R. S. VERMUT, *Assistant Examiner.*